United States Patent [19]

Baker et al.

[11] Patent Number: 5,377,109
[45] Date of Patent: Dec. 27, 1994

[54] FAILSAFE DIGITAL BUS TO ANALOG PROTOCOL CONVERTER SYSTEM

[75] Inventors: John A. Baker, Thousand Oaks; Otto H. Boe, Valencia; Wayne E. Burklund, Los Angeles; Robert W. Edmeads, Camarillo; Melvin G. Oster, Newbury Park, all of Calif.

[73] Assignee: Lear Astronics Corp., Santa Monica, Calif.

[21] Appl. No.: 923,146

[22] Filed: Jul. 31, 1992

[51] Int. Cl.[5] .................. G06F 11/08; G06F 15/50
[52] U.S. Cl. .................. 364/424.06; 364/551.01; 364/580; 364/424.04; 364/424.03; 364/550; 340/945
[58] Field of Search .................. 364/424.01, 424.02, 364/424.03, 424.04, 424.05, 424.06, 551.01, 580, 481; 340/945

[56] References Cited

U.S. PATENT DOCUMENTS

| | | | |
|---|---|---|---|
| 4,604,711 | 8/1986 | Benn et al. | 364/424.06 |
| 4,626,996 | 12/1986 | Arlott | 364/424.06 |
| 4,646,241 | 2/1987 | Ratchford et al. | 364/424.06 |
| 4,649,484 | 3/1987 | Herzog et al. | 364/424.06 |
| 4,656,585 | 4/1987 | Stephenson | 364/424.06 |
| 4,658,359 | 4/1987 | Palatucci et al. | 364/424.06 |
| 4,799,159 | 1/1989 | Davidson et al. | 364/424.06 |
| 5,003,310 | 3/1991 | Thornton | 341/141 |
| 5,019,980 | 5/1991 | Starr et al. | 364/424.04 |
| 5,023,791 | 6/1991 | Herzberg et al. | 364/424.04 |
| 5,184,312 | 2/1993 | Ellis | 364/551.01 |

Primary Examiner—Kevin J. Teska
Assistant Examiner—Jacques Harold Louis-Jacques
Attorney, Agent, or Firm—Gregory L. Roth

[57] ABSTRACT

A failsafe avionics interface unit serves as a protocol converter system for translating data for control purposes from a digital communication bus to an analog control channel as an upgrade or interface to an existing analog control system. The avionics interface unit includes digital interface bus logic, a digital data processor module, an analog interface, and a mode selection circuit. Data communicated over the digital interface bus is periodically translated into equivalent analog control signals. For safety purposes, the avionics interface unit ensures the integrity of the system by repetitively looping back or wrapping the digital equivalents of the analog output signals and comparing them to commanded digital control values. The protocol converter system additionally monitors communications over the digital data bus for data continuity. If the difference between a wrapped digital equivalent of an analog output signal and an expected value exceeds tolerable limits or if communication fails, the system disconnects its interface from control using redundant software and hardware and returns control to the analog control system.

45 Claims, 7 Drawing Sheets

FAILSAFE DIGITAL BUS TO ANALOG PROTOCOL CONVERTER SYSTEM

BACKGROUND OF THE INVENTION

Aircraft have been designed for decades which enable pilots to directly control the aircraft by their instincts or their feelings, i e., "by the seat of their pants". This may have been satisfactory 80 years ago but, with the advent of highly powered and responsive jet fighters, instincts are no longer enough. Now many jet fighters, such as the F-16, have sufficient power to attempt a maneuver that is violent enough to damage the aircraft or black-out the pilot if inadvertently or erroneously requested. Also, the demands on the pilot to coordinate flight controls increase with the power and speed of the aircraft. A slight error can result in the plane going out of control, sometimes irrecoverably. Additionally, with all of this aeronautical capability, more functionality is demanded for the aircraft. In some cases these new functions may consist of systems, such as an autopilot which reduces the work load of the pilot by automatically flying a designated course. It may also be necessary to provide a highly demanding pilot work load function, such as terrain-following, which maintains a designated altitude close to the ground.

In certain high performance aircraft such as the F-16 fighter plane, these functions are accomplished by analog computers. A flight control computer is used to control movement of the airplane control surfaces so as to overcome flying instabilities that result from the aircraft design. The flight control computer may also restrain or limit the commands from the pilot. An additional analog computer may provide a simple function such as an autopilot that maintains a straight and level course.

An analog computer is a series of hard-wired circuits that cause an output signal to vary continuously in a predefined manner in response to one or more input signals. In contrast, a digital computer operates on discrete numbers to generate a sequence of numbers that can define an output signal. Whereas an analog computer must be specially designed and wired for each different relationship between its input and output signals, this relationship is defined in a digital computer by a program that can more easily be changed. Not only is a digital computer more flexible than an analog computer, but a special circuit need not be designed and built for each function that is to be performed. It thus becomes practical to implement more complex functions with a digital computer.

For these reasons, digital computers have generally replaced analog computers in the newest aircraft designs. Nevertheless, there remains a large base of operating aircraft that have analog flight control computers. It would be desirable to provide the flexibility and functionality of digital computers to these aircraft but the cost of replacing the analog computers would be beyond the economic constraints of most operators.

In more modern designs, the aircraft stability is controlled by a digital flight control computer while a mission computer controls multiple complex functions, such as terrain-following and automatic landing systems. This type of digital system is designed into many new aircraft and supersedes the old all-analog approach.

Analog and digital computer systems are inherently incompatible with each other due to the different techniques of communicating information. It is thus not practical to upgrade the functionality of an older aircraft by simply connecting a modern digital computer in place of an existing analog flight control computer. Generally, an upgrade to a digital computer would require major rewiring of an aircraft. Thus, it would be extremely costly to replace the existing analog computers with digital computers. The large inventory of expensive and potentially highly capable aircraft add the emerging power of avionics systems makes it imperative to find a way to economically bring the capabilities of modern digital avionics to existing all-analog aircraft. This invention provides the connection between analog and digital technologies by establishing an interface between new digital mission computers and the analog flight control computer. This invention enables the latest functionality of a digital flight system to be added to existing aircraft while minimizing the conversion costs and minimizing flight requalification on the aircraft since the analog flight control system is maintained with this invention.

SUMMARY OF THE INVENTION

A failsafe, inexpensive avionics interface unit (AIU) in accordance with the invention includes a digital interface circuit coupled to communicate with a digital avionics or mission computer over a system digital data bus, a digital data processor module, an interface digital data bus that provides communications between the digital interface circuit and the digital data processor, an analog interface circuit coupled to generate analog flight control signals in response to digital commands received from the digital data processor and a mode selection circuit. The analog signals are coupled to an analog flight control computer which controls the flight control surfaces of an aircraft. The digital data processor outputs digital commands to the analog interface circuit in response to commands from the digital mission computer.

The AIU extracts pitch, roll, and other avionics information from the received digital data and generates the analog flight control signals in response to this information.

System reliability can be improved by redundantly providing multiple system digital data buses and processing data received from a secondary system digital data bus if communications have failed on the primary system digital data bus.

The mode selection circuit responds to control signals generated by the digital data processor as defined by the digital mission computer to select a source of control signals that are to be communicated to an analog flight control computer to ultimately control the aircraft. The mode selection circuit can select either preexisting sources of command signals or the digital mission computer as the source of the command signals.

The digital data processor module monitors activity on the system digital data bus to determine if periodic communications are occurring. If communications have failed, the processor module negates the selection signal coupled to the mode selection circuit and enables only the pitch and roll commands from the analog avionics computer. Additionally, the AIU includes a watchdog circuit that is coupled to the digital data processor to monitor periodic activity. If periodic activity from the processor is not found, the watchdog circuit negates the selection signal coupled to the mode selection circuit, enabling only the analog pitch and roll commands. In certain modes such as terrain-following, lack of periodic activity would cause the aircraft to roll wings level and to fly up for safety.

Additionally, the AIU determines if the pitch and roll analog signals which are output from the analog interface circuit under control of the digital data processor module are representative of the digital data received using a concept referred to as Logical Output Wraparound (LOW). Using LOW, the analog interface circuitry is connectable to wraparound signals which are periodically sampled and stored by the digital data processor. Upon receipt of a command over the digital data bus from the mission computer, the AIU communicates the digital representation of the sampled analog wraparound signals to the mission computer using the digital data bus. If the mission computer determines that an analog wraparound signal is out of tolerance, it may issue a command to negate the selection signal coupled to the mode selection circuit and enable only the pitch and roll commands from the analog avionics computer. Alternatively, the AIU may internally compare the wraparound signals to commanded digital data and determine if the analog signal is within tolerance. If the wraparound signal is out of tolerance, the AIU communicates this result over the digital data bus to the mission computer which may issue a command to negate the selection signal coupled to the mode selection circuit and enable only the pitch and roll commands from the analog avionics computer.

BRIEF DESCRIPTION OF THE DRAWINGS

A better understanding of the invention may be had from a consideration of the following detailed description, taken in conjunction with the accompanying drawings, in which.

DETAILED DESCRIPTION

Figure 1:
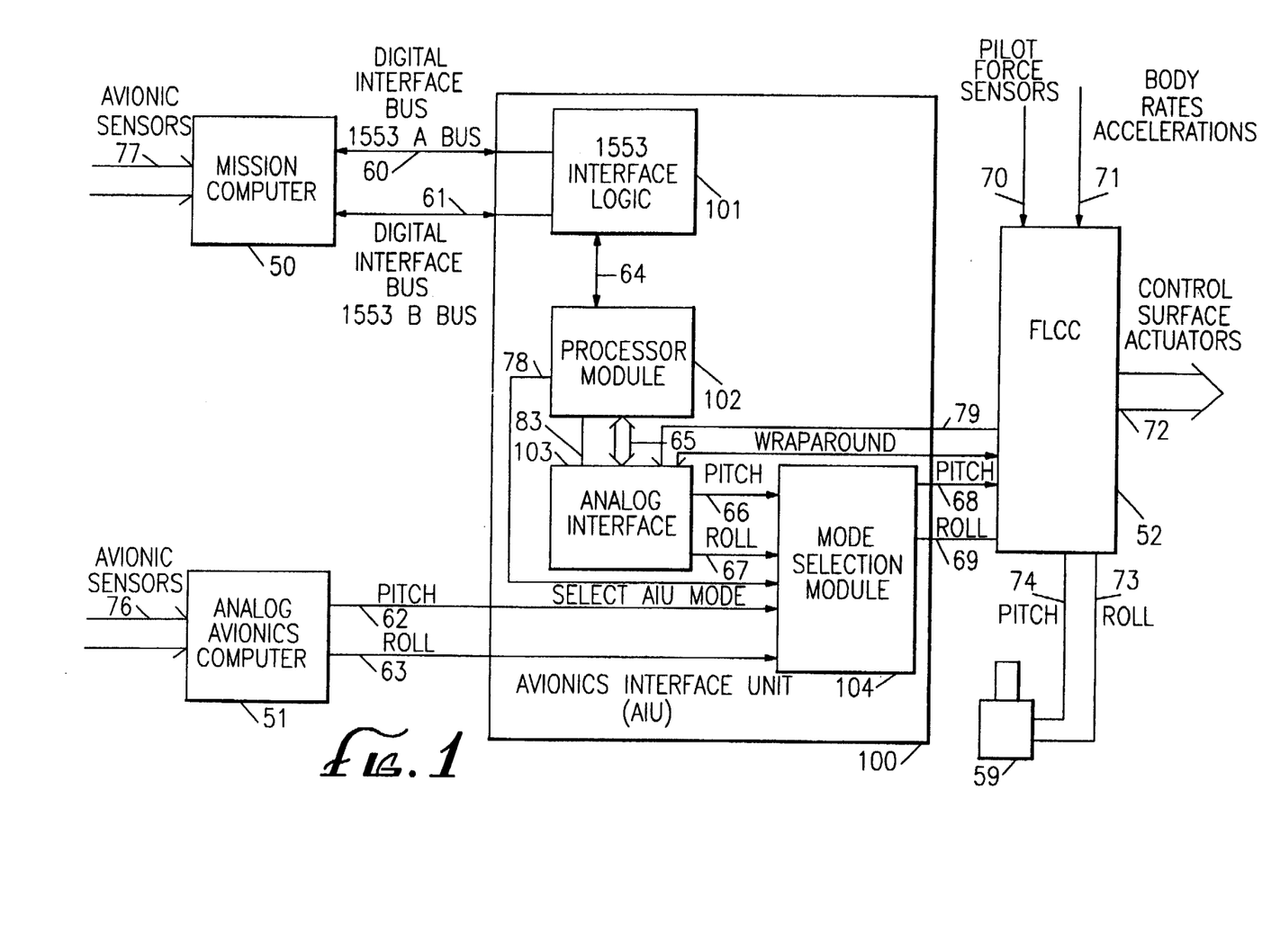
FIG. 1 is a block diagram of an avionics system having an avionics interface unit (AIU) in accordance with the invention.

Referring now to FIG. 1, a failsafe, inexpensive avionics system 10 in accordance with the invention includes a mission computer 50, an analog avionics computer 51, a flight control computer 52, and an avionics interface unit (AIU) 100 coupling the mission computer 50 and the analog avionics computer 51 to the flight control computer 52. The basic goal of an analog avionics system is to provide a stable aeronautic response to pilot commands. These commands typically include analog pitch commands 74 and roll commands 73 from the pilot stick controller 59. In many aircraft, and specifically on the F-16 fighter, direct coupling of the analog pitch commands 74 and roll commands 73 to control surface actuators would result in an unstable and unsafe system. These instabilities may result from aerodynamic instabilities, the ability of the aircraft to exceed structural limits during a maneuver, and the capability of pilots to command a maneuver which will exceed their physical limitations and result in a black-out. To compensate for these airplane design features, a fly-by-wire system has been incorporated using the flight control computer (FLCC) 52.

In a fly-by-wire system, the FLCC 52 is interposed between the pilot commands and the airplane control surfaces. There is no direct connection of pilot commands to the control surfaces. FLCC 52 compensates for mechanical characteristics and, consequently, the flight characteristics of the aerodynamic system by limiting the magnitude and rate of change of analog command signals to the control surfaces according to signals from G-force sensors. The FLCC 52 processes via analog circuits the pitch commands 74 and roll commands 73 from the pilot stick controller 59 and adjusts the control signals 72 according to analog values received from the pilot force sensors 70 and the aircraft body rate accelerations 71. The processing of set points by the FLCC 52 results in a stable fly-by-wire system with a limited rate of change for pitch and roll.

An existing extension of this basic avionics fly-by-wire system is the addition of an analog avionics computer 51 (autopilot), designated in the F-16 as the electronic component assembly (ECA). It is well established in existing art that calculations can be made using various avionics sensors 76 and that the calculations generate the desired adjustments in pitch 62 and roll 63 signals which will result in the aircraft achieving and maintaining the desired course and altitude. Such a system currently exists where the pitch control signal 62 and roll control signal 63 are directly connected to pitch control input 68 and roll control input 69 of the FLCC 52.

The AIU 100 provides additional capabilities in the existing system by allowing this system to interface to new avionics functions which are provided by a digital avionics computer, referred to as the mission computer 50. A mission computer 50 is similar to the analog avionics computer 51 in that the ultimate function is to provide a calculation for the desired pitch and roll parameters as a function of avionics sensors. However, as opposed to the analog avionics computer 51, a current mission computer 50 uses digital technology and is based upon a programmable digital computer with associated advantages in cost and flexibility. Using the digital technology of a mission computer 50, the functionality and performance of a mission computer 50 can be enhanced or modified by altering the software. The software in the mission computer 50 may be downloadable from a ground support computer into alterable memory, such as RAM, EEPROM, or NOVRAM. Alternatively, this software may be resident in nonvolatile memory contained therein such as EPROM, EEPROM, NOVRAM, or ROM. Generally, there will only be a minimal software impact to existing on-board computers as compared to the prior analog, hardware-intensive approach when changes to the performance characteristics of the control system are required.

The addition of AIU 100 enables the advanced functions of a digital mission computer 50 to be integrated with the FLCC 52 without having to redesign the FLCC 52 or rewire the aircraft. Since redesigning the analog FLCC 52, with its attendant rewiring, would be inordinately expensive, the AIU 100 provides access to modern digital technology at a reasonable cost.

The AIU 100 periodically receives digital communication over the digital interface buses 60 or 61. In a typical configuration, the digital interface buses conform to MIL-STD-1553B. Alternatively, the digital interface buses may conform to ARINC429, 1770, 1773; or other digital interface protocol. The 1553 interface is described for illustration. The digital communications are received by the 1553 interface logic 101 and subsequently interpreted by the processor module 102. The processor module 102 then generates commands to the analog interface 103 to output pitch 66 and roll 67 control signals in response to the digital interface commands. The processor module 102 may command the mode selection module 104 to output these pitch 66 and roll 67 commands to the FLCC 52 which generates the signals that move the control surfaces. Alternatively, the processor module may enable the pitch 62 and roll 63 signals generated by the analog avionics computer 51 to be coupled to the FLCC 52.

As previously discussed, to use the increased functionality of the mission computer 50 requires the ability to communicate pitch, roll, or raw data generated by the mission computer 50 over digital interface buses 60 and optionally 61. These digital interfaces are inherently incompatible with existing analog interfaces. This invention bridges this incompatibility gap by establishing a protocol converter, identified as the avionics interface unit (AIU) 100. Additionally, since this approach retains all of the original flight control system, only minimal requalification of the aircraft is required.

The AIU protocol converter 100 receives command data from mission computer 50 over bi-directional digital interface bus A 60 for controlling aircraft maneuvers such as pitch and roll. The characteristics of the bi-directional digital communication bus 60 are well known to one skilled in the art, as defined by MIL-STD-1553B published Sep. 21, 1978 and MIL-STD-1553B Notice 2 published Sep. 8, 1986 which are both incorporated by reference. Alternatively, a second digital interface bus B 61 exists to redundantly provide data from the mission computer 50 to the AIU protocol converter 100. In this implementation the AIU 100 will communicate over the digital interface bus B 61 in the event that a communication failure is detected on digital interface bus A 60.

There are two levels for the 1553 interface communication protocol. The basic transfer of data across the digital interface bus 60 or 61 occurs at the lower protocol level. At this level the data is transferred subject to validity checks but the contents are not interpreted or analyzed. Analysis of the contents occurs at the higher level.

At the lower protocol level commands are transferred at 1.0 megabit per second as time division multiplexed digital data across digital interface bus 60 or 61. This data is Manchester II bi-phase level encoded as described in MIL-STD-1553B. This lower protocol level of communication is provided by the 1553 interface logic 101.

Figure 2:
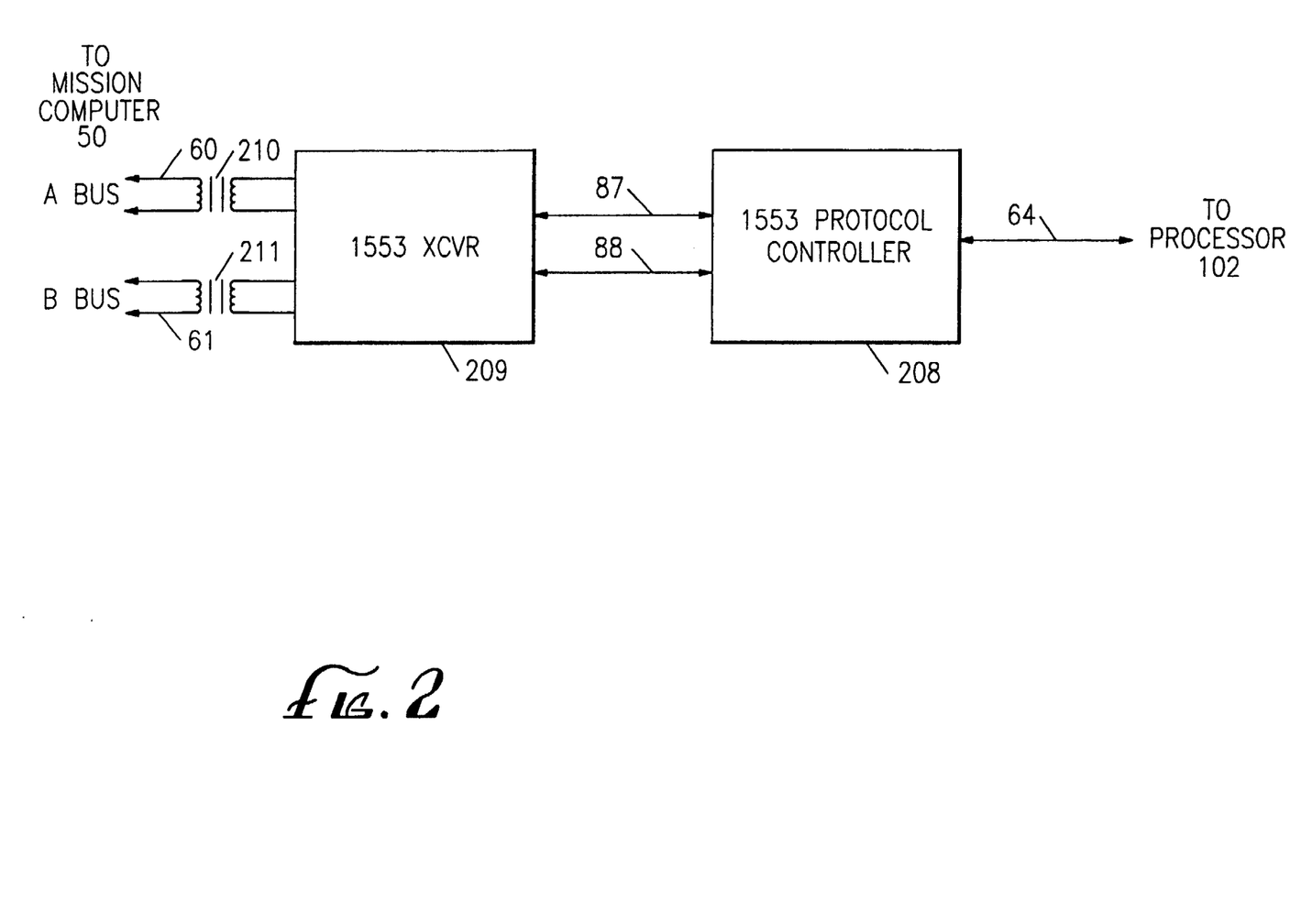
FIG. 2 is a block diagram representation of 1553 interface logic within the AIU that is shown in FIG. 1.

Referring now to FIG. 2, 1553 interface logic 101 includes a 1553 protocol controller 208 and a 1553 XCVR (transceiver) 209. The 1553 transceiver 209 is connected to the digital interface buses 60, 61 through transformers 210 and 211 respectively for DC isolation. The purpose of the 1553 transceiver 209 is to condition the Manchester II bi-phase level signals 60 and 61 received on the digital interface bus into logic level compatible signals 87 and 88 for processing by the 1553 protocol controller 208. The 1553 transceiver 209 decodes the Manchester II bi-phase level signal, through methods well know in the art and as additionally disclosed in MIL-STD-1553B, into an asynchronous serial by bit data stream of logic level bits. This asynchronous serial by bit data stream is then output to the 1553 protocol converter 208 over serial communication paths 87, 88 carrying data relating to buses 60, 61, respectively.

The 1553 protocol converter 208 extracts a clock from this serial data stream, captures this asynchronous serial data stream and stores the data defined by the data stream as buffered words. The 1553 protocol converter 208 then identifies whether this particular AIU system is a designated destination, decodes the message contents, and then, if the data is valid, generates a status response according to MIL-STD-1553B to the digital interface bus 60 or 61 via 1553 XCVR 209. XCVR 209 includes transmitter circuitry that converts the response to a Manchester II bi-phase level signal that is communicated by buses 60, 61.

The 1553 protocol controller 208 and a transceiver 209 can be implemented with conventional components such as an FC1553921 hybrid circuit from a family of transceivers manufactured by STC Components. The specification for this component is incorporated by reference. One skilled in the art can select any of a number of available chip sets to implement this protocol function.

The protocol controller 208 and the 1553 transceiver 209 capture the processed digital communications from the buses 60, 61 to AIU 100 and perform the functions of the lower protocol level. Referring now to FIG. 1, the processor module 102 receives data from the 1553 buses 60, 61 from the interface logic 101 over a signal communicating path 64. The processor module 102 performs the functions of the higher protocol level of interpreting the data received by the digital interface logic 101. The processor module 102 determines the pitch, roll, and diagnostic contents of each aircraft command message received from mission computer 50 or any other command source that may be coupled to buses 60, 61. Once the processor module 102 isolates each new digital pitch and roll command from the captured data signal received over path 64, it outputs this digital data over data communication path 65 along with control signals to the analog interface circuit 103.

Figure 3:
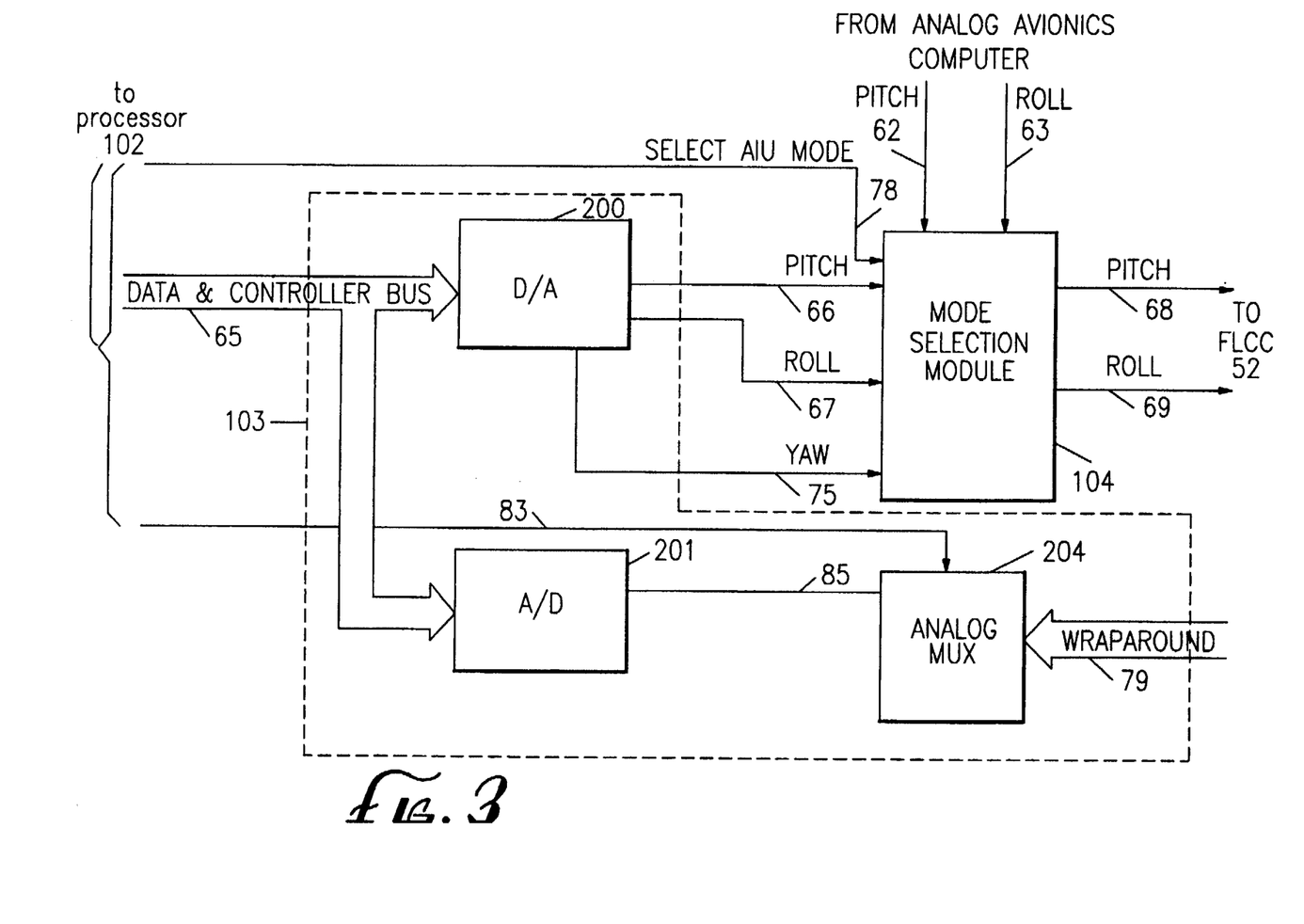
FIG. 3 is a block diagram representation of an analog interface to a flight control computer that is contained by the AIU shown in FIG. 1.

Referring now to FIG. 3, the analog interface 103 includes a D/A (digital to analog) converter 200 and an A/D (analog to digital) converter 201. D/A converter 200 converts digital data received over communication path 65 from digital processor 102 to analog form. Mode selection circuit 104 receives analog data from D/A converter 200 over analog signal paths 66, 67, and 75 and selectively couples these analog output control signals to the FLCC 52. A/D converter 201 and analog MUX 204 couple analog wraparound signals 79 from the FLCC 52 to digital processor 102.

Analog MUX 204 receives a plurality of analog wraparound signals from FLCC 52 over analog data paths 79 and responds to control signals 83 received from digital processor 102 to selectively communicate a selected signal via analog signal path 85 to A/D converter 201. A/D converter 201, in turn, converts the analog signal to a digital format for communication over bus 65 to digital processor 102.

The analog interface 103 isolates, converts, and captures the digital pitch and roll commands from data and control buses 65 and then outputs a stable analog pitch signal 66 and roll signal 67. In a similar manner the analog interface 103 may additionally output a yaw signal 75 when the AIU is interfaced to a mission computer 50 that additionally communicates a calculated yaw signal over the 1553 bus. The analog interface 103 operates under control of the processor module 102. Upon application by the processor module of 102 of I/O signals on the control and data bus 65, the digital to analog converter circuit (D/A) 200 commences a conversion of a 12-bit digital quantity received from bus 65 into a converted analog value pitch 66, roll 67 or yaw 68. The selection of output channel, i.e., pitch 66, roll 67 or yaw 75, is controlled by the I/O control signal 65 to the digital to analog converter circuit 200. The converted analog values are maintained as outputs to the FLCC 52 until next updated by another output command.

The analog interface circuit 103 also samples and stores the analog wraparound signals 79 from the FLCC 52. The FLCC 52 provides at least one wraparound signal for each of the control channels. Thus, there will be a minimum of two wraparound signals from the pitch and roll signals. Alternatively, additional wraparound signals may be provided to further detect and isolate a circuit card failure in the FLCC 52. The wraparound signals 79 are connected to an analog multiplexer circuit 204. This multiplexer circuit is under control of selection signal 83 from the processor module 102. When an analog channel is selected, an analog value is passed through MUX 204 as the selected analog signal 85 which is converted into a 12-bit digital representation by analog to digital (A/D) converter 201 upon command of a selection signal from the data and control bus 65. The 12-bit converted data is subsequently received from the A/D converter 201 by the processor module 102 using data and control bus 65. The digital data is stored in memory in the digital computer 105 until the data is requested by the mission computer 50 over the 1553 bus 60 or 61.

Alternatively, the processor module 102 compares the captured 12-bit representation of the analog wraparound signal 79 to its internal digital command value which was output to the digital to analog converter 200. When the captured 12-bit data is out of tolerance, as compared to the digital command value, this information is made available to the mission computer 50 over the digital data bus 60 or 61. The mission computer 50 may then communicate a command to the AIU 100 over the digital data bus 60 or 61 to negate the select AIU mode signal 78 to disable the pitch 68 and roll 69 signal from the AIU 100 and enable the pitch 62 and roll 63 signals from the analog avionics computer 51.

The function of the mode selection module 104 is to choose between the analog pitch 62 and roll 63 controls generated by the analog avionics computer 51 and the pitch 66, roll 67, and yaw 75 controls which are output from D/A converter 200. This selection is done by a select AIU mode signal 78 which is generated by processor module 102. The mode selection circuitry 104 is preferably implemented as a solid state switch. Alternatively, mode selection module 104 may be implemented as a mechanical switch where the failed or unpowered state of the switch connects the analog avionics computer pitch command 62 and roll command 63 to pitch output signal 68 and roll output signal 69, respectively.

Figure 4:
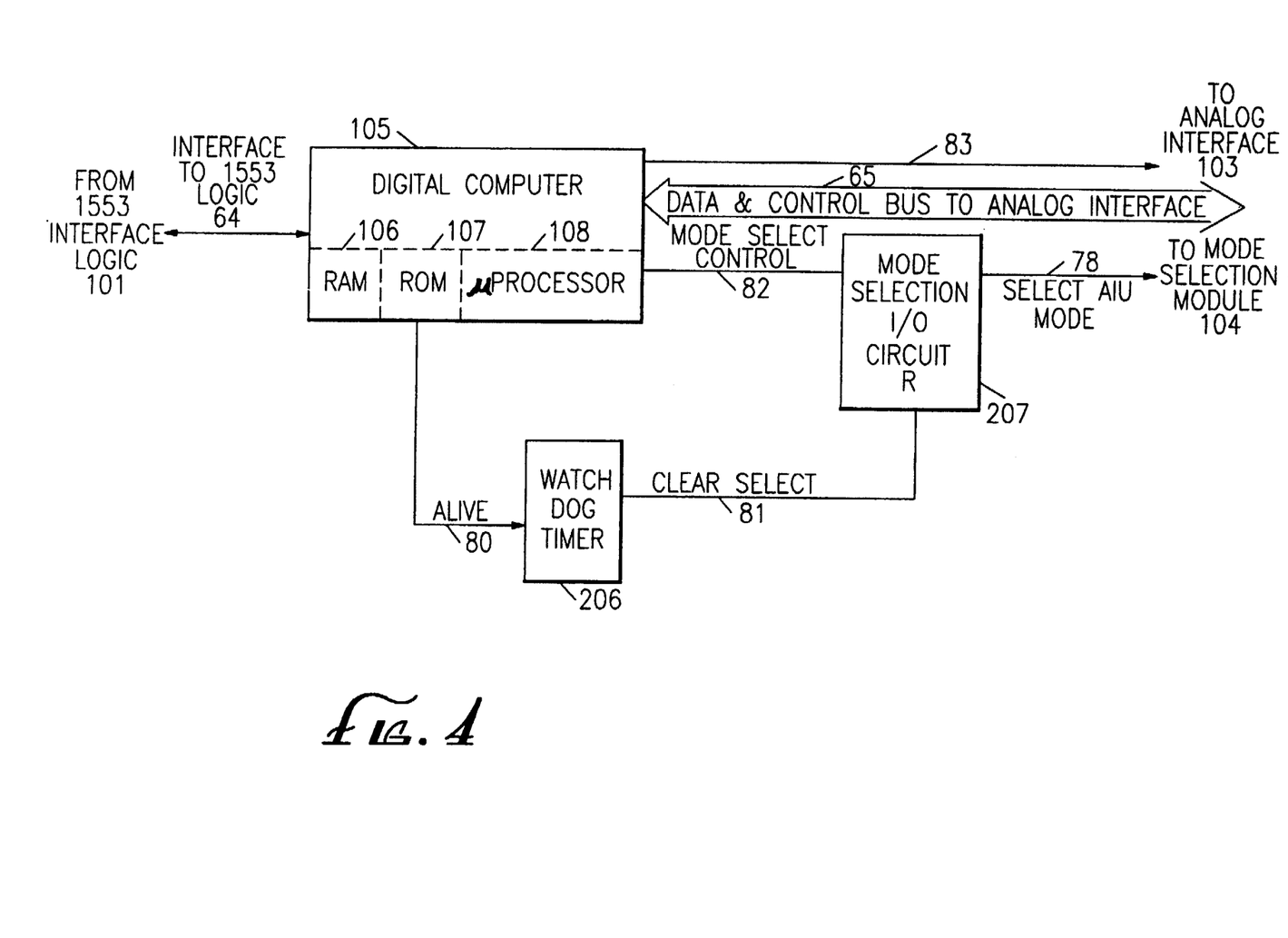
FIG. 4 is a block diagram representation of a processor module within the AIU that is shown in FIG. 1.

Referring now to FIG. 4, the digital data processor module 102 includes a digital computer 105, a watchdog timer circuit 206, and a mode selection I/O circuit 207. The digital computer 105 includes RAM 106, ROM 107, a microprocessor 108, and such other components as may be necessary to implement a conventional digital computer.

Mode selection signal 78 is generated under control of the digital computer 105. When the digital computer 105 receives a specified command from the 1553 bus 60 or 61, the digital computer 105 generates a mode select control signal 82 to instruct the mode selection I/O circuit 207 to generate the select AIU mode signal 78.

However, under special conditions, the select AIU mode signal 78 will be negated even though it has previously been activated, thereby defaulting the system back to being an all-analog system. The analog default serves as a failsafe condition wherein the analog avionics computer 51 connects directly to the FLCC 52. Should digital computer 105 fail to receive periodically updated commands from 1553 digital interface bus 60 or 61, the select AIU mode signal 78 will be disabled to a failsafe condition under software control by the digital computer 105 by issuing a command on mode select control signal 82. Further, as a final precaution, a watchdog timer circuit 206 found in processor module 102 disables select AIU mode signal 78 by outputting a clear select signal 81 if periodic activity of the digital computer 105 is not detected. The watchdog timer circuit 206 monitors the digital computer by watching the alive signal 80 which the digital computer 105 periodically outputs when the digital computer 105 is processing instructions.

The digital computer 105 executes instructions contained in nonvolatile program storage memory such as ROM 107 or, alternatively, in EPROM, EEPROM or NOVRAM. Alternatively, data received over the digital data bus 60 or 61 may be used to modify the contents of the program storage memory of the digital computer 105 when an alterable type of program storage memory is used such as RAM 106 or, alternatively, EEPROM or NOVRAM.

Additionally, in an alternative embodiment, the digital computer 105 may perform calculations for flight control functions, such as those required of an autopilot, by receiving the raw sensor information from the digital data bus 60 or 61 and performing calculations upon this data under control of instructions stored by program storage memory to generate pitch and roll commands which are communicated to the analog interface circuit 103.

Figure 5:
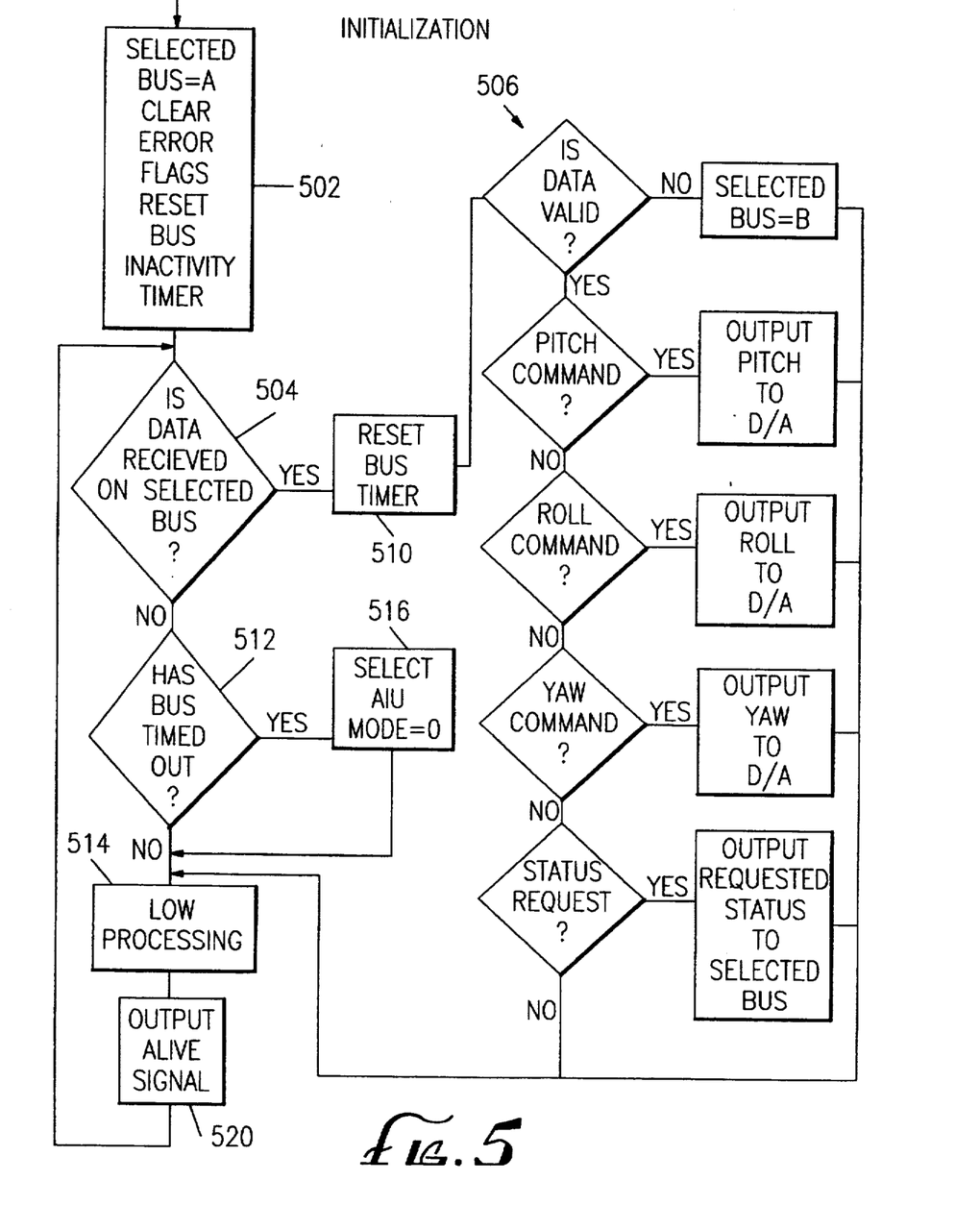
FIG. 5 is a flowchart representation of the program executed by the processor module within the AIU that is shown in FIG. 1.

A flowchart illustrating the operating digital computer 105 is shown in FIG. 5, to which reference is now made. When power is applied to the digital computer 105, initialization of program parameters occurs at step 502. This initialization includes the selection of bus A 60 as the primary communication bus, clearing error flags, and initializing timers. Once the initialization 502 is complete, the digital computer 105 periodically looks for data being received from the 1553 interface logic 101 at decision step 504. If a message is received, the digital computer 105 is informed by the 1553 interface logic 101 if the data is properly received and if the data was addressed to AIU 100. If yes, the digital computer 105 performs the higher level of the 1553 protocol and analyzes the contents of the message at analysis step 506. A message may be a command to output pitch, roll, or yaw commands or may be a request of status information. When a flight control command is received, the digital computer 105 directs an output command to the selected channel of D/A 200. Additionally, the processor acts at step 510 to reset an inactivity timer which monitors the bus 60 or 61 to determine if bus communications have terminated.

If a message has not been received, the processor determines at step 512 from the inactivity timer if the bus communications have terminated. If the timeout period has not been exceeded, processing continues by executing a LOW test at step 514. However, if a timeout condition occurs, the digital computer 105 executes step 516 to reset the select AIU mode signal 78 with a mode select control signal 82 and relinquish control of the pitch command 68 and roll command 69 to the analog avionics computer 51.

Figure 6A:
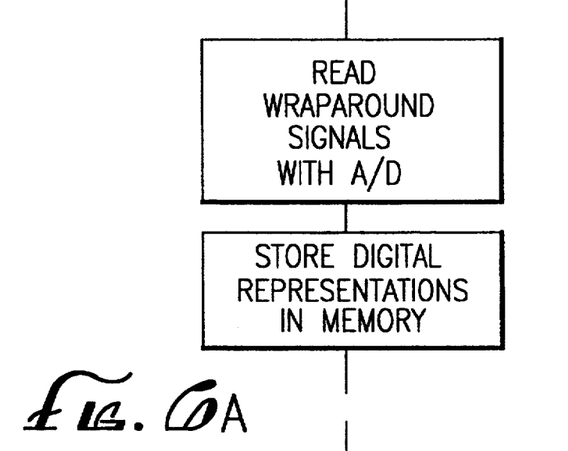
FIG. 6A and 6B are flowchart representations of alternative programs for implementation of the logical output wraparound (LOW) function that is executed by the processor module within the AIU that is shown in FIG. 1.
Figure 6B:
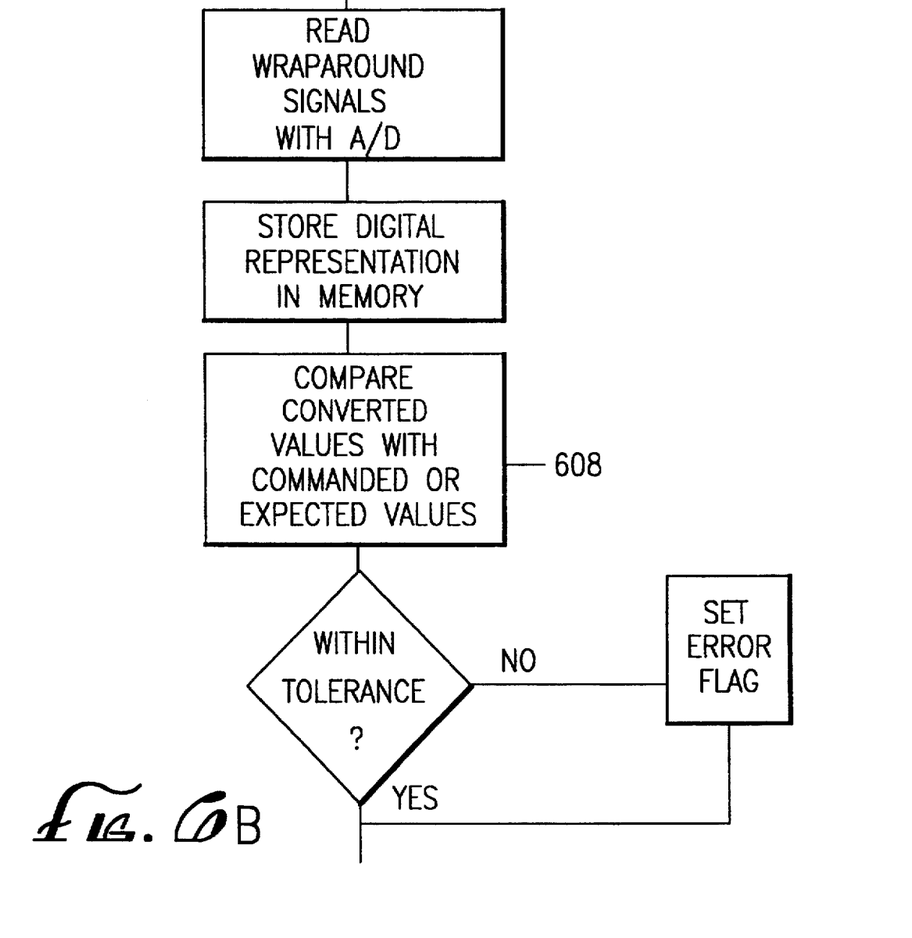

As illustrated in FIG. 6A, the processor executes the LOW processing step 514 by reading all available wraparound signals 79 and storing their 12-bit digital representations in memory. The contents of this memory are then communicated to the mission computer 50 in response to a designated status command. In an alternative mode, as illustrated in FIG. 6B, the wraparound signals 79 are evaluated by digital computer 105. After reading and storing the digital representations of the wraparound signals 79, the processor 105 compares these values to expected values at step value 608. In the case of pitch and roll commands, the expected value corresponds to the digital value output to the D/A 200. However, other expected values could correspond to internal test points in the FLCC 52.

Upon completing the LOW processing step, the processor 105 outputs the alive signal 80 by executing step 520. This signal does not directly effect the operation of the program. However, this signal informs the watchdog timer circuit 206 that the digital computer 105 is operational. If the alive signal 80 is not generated for a designated period of time, the watchdog timer 206 (FIG. 4) generates a clear select signal on conductor 81 which causes mode selection I/O circuit 207 to negate signal SELECT AIU MODE on signal path 78. After generating the output alive signal at step 520, the computer 105 loops back to the data received test at step 504.

Figure 7:
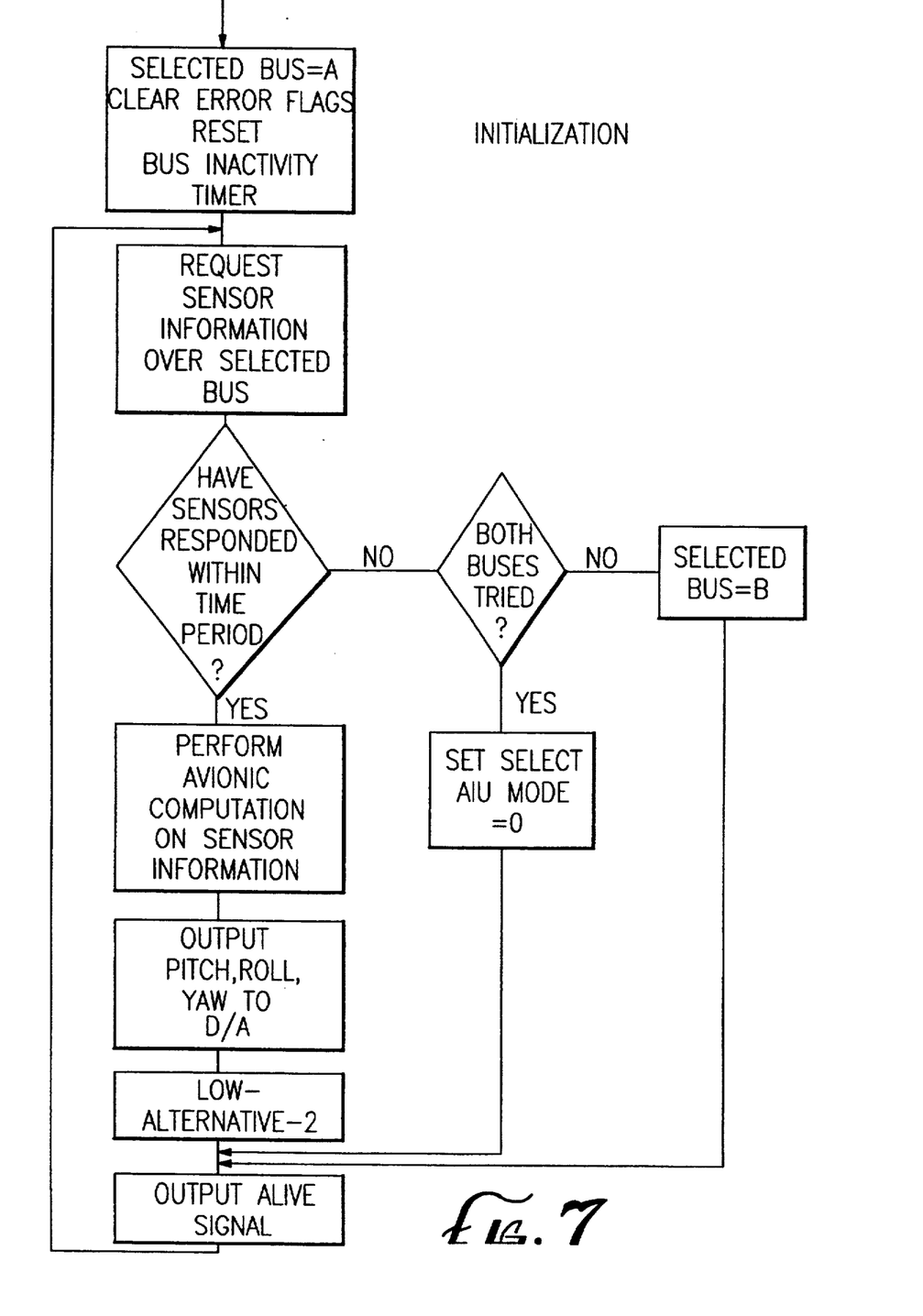
FIG. 7 is a flowchart representation of an alternative program executed by the processor module within the AIU that is shown in FIG. 1.

FIG. 7 illustrates an alternative embodiment of the program executed by computer 105. Instead of the AIU 100 being a slave dependent on commands from a mission computer 50, the AIU 100 operates as a master requesting raw sensor information from devices interfaced to the same 1553 bus. The program in the digital computer 105 of the AIU 100 performs avionic functions that are performed in the mission computer 50 in the embodiment of the program that is illustrated in FIG. 5. By eliminating an additional system component, the mission computer 50, and the associated communications, increased economies and performance advantages may be achieved by moving flight control command functions from mission computer 50 to digital computer 105.

Although there have been described above specific arrangements of a digital interface to an analog flight control computer including a protocol converter system in accordance with the invention for the purpose of enabling a person of ordinary skill in the art to make and use the invention, it will be appreciated that the invention is not limited thereto. Accordingly, any and all modifications, variations or equivalent arrangements within the scope of the attached claims should be considered to be within the scope of the invention.

What is claimed is:

1. A protocol converter system comprising:
   a digital interface circuit which is adapted for connection to a digital data bus, the digital interface circuit receiving flight control information from the digital data bus and operating in response to the received flight control information to output at least one first digital flight control signal representing the received flight control information;
   an analog interface circuit coupled to receive at least one second digital flight control signal from a digital data processor, the analog interface circuit operating in response to each received second digital flight control signal to generate and output an analog flight control signal commanding an aircraft analog flight control computer to execute a maneuver commanded by the received second digital flight control signal; and
   the digital data processor coupled to receive the at least one first digital flight control signal from the digital interface circuit, the digital data processor generating and outputting in response to each received first digital flight control signal one of the at least one second digital flight control signals representing the flight control information represented by the first digital flight control signal.

2. A protocol converter system according to claim 1 wherein the received flight control information represented by each first digital flight control signal is generated by a digital control computer and communicated to the digital interface circuit over the digital data bus.

3. A protocol converter system according to claim 1 wherein the digital data processor generates an alive signal if the digital data processor is properly executing instructions and generates a mode selection signal selecting an analog control signal source to be coupled to the aircraft analog flight control computer; and further comprising:
   a mode selection circuit that is coupled to receive each analog flight control signal generated by the analog interface circuit and to receive at least one second analog flight control signal from an analog avionics computer, said second analog flight control signal being adapted to be coupled to the aircraft analog flight control computer, the mode selection circuit also being coupled to receive the mode selection signal, the mode selection signal responding to the selection signal by selecting either the first or the second outputting the selected analog control signal as a command signal for the aircraft analog flight control computer.

4. A protocol converter system according to claim 3 further comprising:
   a fault detection circuit to output a selection override signal to the mode selection circuit upon failing to receive any flight control information generated by the digital mission computer, the mode selection circuit operating in response to the received selection override signal to choose the at least one second analog control signal generated by the analog avionics computer as the source of the second analog control signal that is coupled to the aircraft analog flight control computer.

5. A protocol converter system according to claim 4 wherein the selection override signal is outputted by the fault detection circuit when the digital data processor fails receive any flight control information generated by the digital mission computer.

6. A protocol converter system according to claim 3 further comprising:

a watchdog timer circuit coupled to receive the alive signal generated by the digital data processor, the watchdog timer circuit being coupled to output a clear select signal in response to the watchdog timer circuit failing to receive at least one alive signal, the mode selection circuit operating in response to the received clear select signal by choosing the at last one second analog control signal generated by the analog avionics computer as the source of the second analog control signal that is coupled to the aircraft analog flight control computer.

7. A protocol converter system according to claim 1 further comprising:

at least one additional digital data bus communicating redundant flight control information to and from the digital interface circuit.

8. A protocol converter system according to claim 7 wherein the communication on the digital data bus conforms to MIL-STD-1553B.

9. A protocol converter system according to claim 1 wherein the communication on the digital data bus conforms to MIL-STD-1553B.

10. A protocol converter system according to claim 1 wherein the digital data processor executes instructions contained within read only memory.

11. A protocol converter system according to claim 1 wherein the digital data processor includes alterable memory, stores instructions received from the digital data bus in said alterable memory, and executes instructions from said alterable memory.

12. A protocol converter system according to claim 11 wherein the alterable memory retains its contents in the event of a power interruption.

13. A protocol converter system according to claim 11 wherein the alterable memory loses its contents in the event of a power interruption.

14. A protocol converter system according to claim 1 further comprising:

an analog sample circuit coupled to receive at least one analog wraparound signal provided by the aircraft analog flight control computer, the analog sample circuit converting each received analog wraparound signal to a digital value, the digital data processor receiving and storing each digital value and communicating each digital value to the digital control computer in response to a request received from the digital data bus.

15. A protocol converter system according to claim 14 wherein each of at least one second analog flight control signal generated by an analog avionics computer is adapted to be connected to the analog flight control computer and further comprising:

a mode selection circuit coupled to receive a mode selection signal generated by the digital data processor the mode selection signal selecting an analog control signal source to be coupled to the analog flight control computer by choosing between the at least one first-mentioned analog flight control signal output by the analog interface circuit and the at least one second analog control signal generated by the analog avionics computer.

16. A protocol converter system according to claim 14 wherein the analog sample circuit converts each received analog wraparound signal to a 12-bit digital representation and the digital data processor stores the converted 12-bit representations.

17. A protocol converter system according to claim 1 wherein the system further includes the first-mentioned digital data bus and a second digital data bus, the first-mentioned and the second digital data bus each communicating in conformance with MIL-STD-1553B, and each communicating redundant information from the digital control computer to a digital interface circuit.

18. A protocol converter system according to claim 1 further comprising:

an analog sample circuit coupled to receive at least one analog wraparound signal, the analog sample circuit converting each received analog wraparound signal to a digital value, the digital data processor storing each digital value, comparing each stored digital value to a commanded digital value represented the second digital flight control signal generated by the digital data processor and communicating the result of the comparison to the digital control computer.

19. A protocol converter system according to claim 1 wherein each second digital flight control signal coupled to the analog interface circuit is a 12-bit digital signal.

20. A protocol converter system according to claim 1 wherein the analog interface circuit includes:

a digital to analog converter coupled to receive at least one second digital flight control signal from the digital data processor, the digital to analog converter operating in response to each received second digital flight control signal to generate and output an analog flight control signal commanding an aircraft analog flight control computer to execute a maneuver commanded by the received second digital flight control signal.

21. A protocol converter system according to claim 20 wherein the digital data processor generates a selection signal selecting an analog control signal source to be coupled to the aircraft analog flight control computer; and further comprising:

a mode selection circuit that is coupled to receive at least one second analog flight control signal from an analog avionics computer, said second analog flight control signal being adapted to be coupled to the aircraft analog flight control computer, the mode selection circuit also being coupled to receive the selection signal, the mode selection circuit responding to the selection signal by selecting either the first or the second analog control signal and outputting the selected analog control signal as a command signal for the aircraft analog flight control computer.

22. A protocol converter system according to claim 21 further comprising:

a fault detection circuit coupled to output a selection override signal to the mode selection circuit, the mode selection circuit operating in response to the received selection override signal by choosing the at least one second analog control signal generated by the analog avionics computer as the source of the second analog control signal that is coupled to the aircraft analog flight control computer.

23. A protocol converter system comprising:
   a digital interface circuit which is adapted for connection to a digital data bus, the digital interface circuit receiving from the digital data bus flight control information generated by a digital avionics computer and operating in response to the received flight control information to output at least one first digital flight control signal representing the received flight control information;
   an analog interface circuit coupled to receive at least one second digital flight control signal from a digital data processor, the analog interface circuit operating in response to each received second digital flight control signal to generate and output an analog flight control signal commanding an aircraft analog flight control computer to execute a maneuver commanded by the received second digital flight control signal; and
   the digital data processor coupled to receive from the digital interface circuit the at least one first digital flight control signal generated by the digital avionics computer, the digital data processor generating and outputting in response to each received first digital flight control signal one of the at least one second digital flight control signals representing the flight control information of the first digital flight control signal.

24. A protocol converter system according to claim 23 wherein the digital data processor generates an alive signal if the digital data processor is properly executing instructions and generates a selection signal selecting an analog control signal source to be coupled to the aircraft analog flight control computer; and further comprising:
   a mode selection circuit that is coupled to receive at least one second analog flight control signal from an analog avionics computer, said second analog flight control signal being adapted to be coupled to the aircraft analog flight control computer, the mode selection circuit also being coupled to receive the selection signal, the mode selection circuit responding to the selection signal by selecting either the first or the second analog control signal and outputting the selected analog control signal as a command signal for the aircraft analog flight control computer.

25. A protocol converter system according to claim 24 further comprising:
   a fault detection circuit coupled to output a selection override signal to a mode selection circuit; and the mode selection circuit operating in response to the received selection override signal and choosing one of the at least one second analog control signal generated by the analog avionics computer as an analog control signal source to be coupled to the aircraft analog flight control computer.

26. A protocol converter system according to claim 25 wherein the selection override signal is outputted by the fault detection circuit when the digital data processor fails to receive any flight control information generated by the digital mission computer.

27. A protocol converter system according to claim 24 further comprising:
   a watchdog timer circuit coupled to receive the alive signal generated by digital data processor, the watchdog timer circuit being coupled to output a clear select signal in response to the watchdog timer circuit failing to receive at least one alive signal, the mode selection circuit operating in response to the received clear select signal by choosing the at least one second analog control signal generated by the analog avionics computer as the source of the second analog control signal that is coupled to the aircraft analog flight control computer.

28. A protocol converter system comprising:
   a digital interface circuit which is adapted for connection to at least one digital data bus, the digital interface circuit receiving from said digital data bus flight control information generated by a digital avionics computer and operating in response to the received flight control information to output at least one first digital flight control signal representing the received flight control information;
   an analog interface circuit coupled to receive at least one second digital flight control signal from a digital data processor, the analog interface circuit operating in response to each received second digital flight control signal to generate and output an analog flight control signal commanding an aircraft analog flight control computer to execute a maneuver commanded by the received second digital flight control signal; and
   the digital data processor coupled to receive from the digital interface circuit the at least one first digital flight control signal representing flight control information generated by the digital avionics computer, the digital data processor generating and outputting in response to each received first digital flight control signal one of the at least one second digital flight control signals representing the flight control information represented by the first digital flight control signal.

29. A protocol converter system according to claim 28 wherein the communication on the digital data bus conforms to MIL-STD-1553B.

30. A protocol converter system according to claim 28 wherein the system further includes two digital data buses, each communicating in conformance with MIL-STD-1553B, and each communicating redundant information from the digital avionics computer to the digital interface circuit.

31. A protocol converter system comprising:
   a digital interface circuit which is connectable to at least one digital data bus, the digital interface circuit receiving from said digital data bus flight control information generated by a digital avionics computer and operating in response to the received flight control information to output at least one first digital flight control signal representing the received flight control information;
   an analog interface circuit coupled to receive at least one second digital flight control signal from a translation circuit, the analog interface circuit operating in response to each received second digital flight control signal to generate and output an analog flight control signal commanding an aircraft analog flight control computer to execute a maneuver commanded by the received second digital flight control signal; and
   the translation circuit coupled to receive from the digital interface circuit the at least one first digital flight control signal generated by the digital avionics computer, the translation circuit generating and outputting in response to each received first digital flight control signal one of the at least one second digital flight control signals representing the flight control information represented by the first digital flight control signal.

32. A protocol converter system comprising:

a digital interface circuit which is adapted for coupling to the at least one digital data bus, the digital interface circuit receiving from said digital data bus control and status information generated by a digital computer and operating in response to the received control and status information to output at least one first digital control signal representing the received control and status information;

an analog interface circuit coupled to receive at least one second digital control signal from a translation circuit, the analog interface circuit operating in response to each received second digital flight control signal to generate and output an analog control signal controlling aircraft control surfaces to execute a maneuver commanded by the received second digital control signal; and the translation circuit coupled to receive from the digital interface circuit the at least one first digital control signal carrying control information generated by the digital computer, the translation circuit generating and outputting in response to each received first digital control signal one of the at least one second digital control signals representing the control information represented by the first digital control signal.

33. A protocol converter system coupled between at least one digital data bus and an aircraft analog flight control computer, the at least one digital data bus communicating with a digital avionics computer, the protocol converter system comprising:

a digital interface circuit which is adapted for connection to the at least one digital data bus, the digital interface circuit receiving from said digital data bus flight control information generated by a digital avionics computer and operating in response to the received flight control information to output at least one first digital flight control signal representing the received flight control information;

an analog interface circuit coupled to receive at least one second digital flight control signal from a digital data processor, the analog interface circuit operating in response to each received second digital flight control signal to generate and output an analog flight control signal commanding an aircraft analog flight control computer to execute a maneuver commanded by the received second digital flight control signal; and the digital data processor including a nonvolatile memory which stores instructions received from the digital data bus, the digital data processor executing the instructions stored in the nonvolatile memory, the digital data processor being coupled to receive from the digital interface circuit the at least one first digital flight control signal generated by the digital avionics computer, and the digital data processor generating and outputting in response to each received first digital flight control signal one of the at least one second digital flight control signals representing the flight control information represented by the first digital flight control signal.

34. A protocol converter system according to claim 33 wherein the digital data processor further includes an alterable memory, stores instructions received from the digital data bus in said alterable memory, and executes instructions stored in the alterable memory.

35. A protocol converter system coupled between at least one digital data bus and an aircraft analog flight control computer, the at least one digital data bus communicating with a digital avionics computer, the protocol converter system comprising:

a digital interface circuit which is adapted for coupling to the at least one digital data bus, the digital interface circuit receiving over said digital data bus avionics information generated by the digital avionics computer and operating in response to the received avionics information to output at least one first digital flight control signal representing the received flight control information;

an analog interface circuit coupled to receive at least one second digital flight control signal from a digital data processor, the analog interface circuit operating in response to each received second digital flight control signal to generate and output an analog flight control signal commanding an aircraft analog flight control computer to execute a maneuver commanded by the received second digital flight control signal;

the digital data processor coupled to receive from the digital interface circuit the at least one first digital flight control signal carrying the flight control information generated by the digital avionics computer, the digital data processor generating and outputting in response to each received first digital flight control signal one of the at least one second digital flight control signals representing the flight control information of the first received digital flight control signal; and an analog sample circuit coupled to receive at least one analog wraparound signal provided by the aircraft analog flight control computer and coupled to the digital data processor, the analog sample circuit converting each received analog wraparound signal to a digital value and communicating the digital value to the digital data processor, the digital data processor storing each digital value and communicating each digital value to the digital data bus for communicating to the digital avionics computer in response to a request received from the digital data bus.

36. A protocol converter system according to claim 35 wherein an analog avionics computer generates at least one second analog flight control signal, each of the at least one second analog flight control signal being adapted to be connected to the analog flight control computer and further comprising:

a mode selection circuit coupled to receive a selection signal generated by the digital data processor and operating in response to the received selection signal to select an analog control signal to be coupled to the analog flight control computer, the selected analog control signal being selected from a group of signals including at least the first-mentioned analog flight control signal output by the analog interface circuit and at least one second analog control signal generated by the analog avionics computer.

37. A protocol converter system according to claim 35 wherein the analog sample circuit converts each received analog wraparound signal to a 12-bit digital representation and the digital data processor stores the converted 12-bit representations.

38. An avionics system comprising:
 a digital avionics computer which is adapted for connection to at least one digital interface bus, the digital avionics computer communicating digital flight control information and digital status information over the digital interface bus;
 a protocol converter system coupled to receive digital flight control information and digital status information from at least one digital interface bus that is adapted for connection to a digital avionics computer, the protocol converter system operating in response to the received digital communications to output at least one analog flight control signal representing the received flight control information; and
 a flight control computer coupled to receive at least one analog flight control signal from the protocol converter system and operating in response to each received analog flight control signal to generate an analog command signal commanding a mechanical actuator to execute a commanded maneuver.

39. An avionics system comprising:
 at least one digital interface bus;
 a digital avionics computer which is adapted for connection to the at least one digital interface bus, said digital interface bus being used by the digital avionics computer to provide digital flight control information and to receive digital representations of analog wraparound signals generated by an aircraft analog flight control computer;
 a protocol converter system that is coupled to at least one digital interface bus, the protocol converter system receiving over the digital data bus digital flight control information provided by the digital avionics computer and translating the received digital flight control information into at least one analog flight control signal representing the received digital flight control information; and
 the aircraft analog flight control computer coupled to receive at least one analog flight control signal from the protocol converter system, the analog flight computer operating in response to each received analog flight control signal to generate a command signal for a mechanical actuator to execute a commanded maneuver.

40. An avionics system comprising:
 at least one digital interface bus;
 a digital avionics computer which is coupled to the at least one digital interface bus, the digital avionics computer communicating digital flight control information to the digital interface bus and receiving digital status information from the digital interface bus;
 a protocol converter system that is coupled to communicate with the digital avionics computer over the at least one digital interface bus, the protocol converter system receiving digital communications from the digital avionics computer over the digital data bus and translating the received digital communications into at least one analog flight control signal representing the received digital communications, the protocol converter system receiving samples of analog wraparound control signals generated by an aircraft analog flight control computer, storing digital representations of the received analog wraparound control signals, and communicating each stored digital representation of an analog wraparound control signal to the digital avionics computer; and
 the aircraft analog flight control computer coupled to receive at least one analog flight control signal from the protocol converter system, the analog flight computer operating in response to each received analog flight control signal to generate and output a command signal for a mechanical actuator that commands an aircraft maneuver.

41. An avionics system according to claim 40 wherein each sampled analog wraparound control signal is sampled and stored as a 12-bit digital representation.

42. An avionics system comprising:
 a digital data bus;
 a digital avionics computer coupled to communicate over the digital data bus, the digital avionics computer providing digital flight control information and receiving digital representation of analog wraparound signals generated by an aircraft analog flight control computer;
 a protocol converter system that is coupled to communicate with the digital avionics computer using the digital data bus, the protocol converter system receiving digital communications from the avionics computer and translating the received digital communications into at least one analog flight control signal representing the received digital communications, the protocol converter system sampling and storing digital representations of analog wraparound control signals generated by the analog flight control computer and communicating upon demand by the digital avionics computer these digital representations of analog wraparound control signals over the digital data bus; and
 the aircraft analog flight control computer coupled to receive at least one analog flight control signal from the protocol converter system, the aircraft analog flight computer operating in response to each received analog flight control signal to generate two identical analog flight control signals, wherein the first said analog flight control signal is coupled command a mechanical actuator to execute a commanded maneuver and the second analog flight control signal is the analog wraparound signal that is received by the protocol converter system.

43. An avionics system according to claim 42 wherein the sampled analog wraparound control signals are sampled and stored as 12-bit digital representations.

44. An avionics system according to claim 42 further comprising:
 an analog sample circuit coupled to receive at least one analog wraparound signal provided by the aircraft analog flight control computer, the analog sample circuit converting each received analog wraparound signal to a digital value, the protocol converter system receiving and storing each digital value and communicating each digital value to the digital control computer in response to a request received from the digital data bus.

45. An avionics system comprising:
 a digital interface circuit which is adapted for connection to a digital data bus, the digital interface circuit receiving flight control information from the digital data bus and operating in response to the received avionic sensor information to output at least one first digital flight control signal representing the received avionic sensor information;

a digital data processor coupled to receive the at least one first digital flight control signal from the digital interface circuit, the digital data processor generating and outputting in response to each received first digital flight control signal one of the at least one second digital flight control signals representing the avionic sensor information represented by the first digital flight control signal; and an analog interface circuit coupled to receive at least one second digital flight control signal from the digital data processor, the analog interface circuit operating in response to each received second digital flight control signal to generate and output an analog flight control signal commanding an aircraft analog flight control computer to execute a maneuver commanded by the received second digital flight control signal derived by the digital data processor in response to the received avionic sensor information.

* * * * *